United States Patent [19]
Horton

[11] Patent Number: 5,488,810
[45] Date of Patent: Feb. 6, 1996

[54] POST CAP

[75] Inventor: Jim W. Horton, Jacksonville, Fla.

[73] Assignee: Southeastern Metals Mfg. Co., Inc.

[21] Appl. No.: 110,982

[22] Filed: Aug. 24, 1993

[51] Int. Cl.⁶ .................................. E04B 1/38; F16B 1/00
[52] U.S. Cl. .............................. 52/715; 52/301; 403/178; 403/230; 403/232.1
[58] Field of Search ............................ 52/715, 712, 698, 52/300, 301, 655.1; 403/231, 230, 233, 217, 170, 178, 232.1; D25/135, 134, 127, 44; 428/542.8, 131, 134, 136, 577

[56] References Cited

U.S. PATENT DOCUMENTS

| | | | |
|---|---|---|---|
| 727,047 | 5/1903 | Williamson | 403/230 X |
| 813,253 | 2/1906 | Sullivan | 52/715 X |
| 932,197 | 8/1909 | Waite | 52/715 |
| 963,585 | 7/1910 | Kimball | 403/231 |
| 1,075,123 | 10/1913 | Scheas | 52/715 X |
| 1,260,531 | 3/1918 | Fiala | 52/698 X |
| 1,562,784 | 11/1925 | Olsen | 52/715 X |
| 1,905,616 | 4/1933 | Zanella | 52/715 |
| 1,931,739 | 10/1933 | Rutten | 52/715 X |
| 2,084,758 | 6/1937 | Anderson | 403/231 |
| 4,572,695 | 2/1986 | Gilb | 403/230 X |
| 5,259,685 | 11/1993 | Gilb | 403/231 |
| 5,307,603 | 5/1994 | Chiodo | 52/698 |
| 5,377,472 | 1/1995 | Terenzon | 52/715 X |

OTHER PUBLICATIONS

1982 Sweets Catalog File 4 pages.
Teco Products Structural Wood Fasteners 1972 p. 6.

Primary Examiner—Carl D. Friedman
Assistant Examiner—Robert J. Canfield
Attorney, Agent, or Firm—Arthur G. Yeager

[57] ABSTRACT

A device for joining two beams at a right angle with one beam, preferably vertical, abutting to other beam, preferably horizontal. The cap is a single sheet which is cut, punched, and folded to form a saddle for each adjoining beam, a plurality of nail guide holes to attach the device firmly to each beam and a pair of slotted holes to guide a toenail for piercing both beams at their plane of juncture.

27 Claims, 3 Drawing Sheets

POST CAP

BACKGROUND OF THE INVENTION

In the construction of structures using wooden beams, joists, and studs, there are many instances where beams are joined with the sawed end of one beam butted against the longitudinal face of another beam. For decades in the past the beams were joined by sawing the branch beam at the appropriate angle and toe nailing it to the main beam. A few years ago it became popular to use steel hangers that could be nailed to each beam and to provide each beam with a stirrup seat. Many varieties of such hangers are now available on the market. Many of which are of a welded construction and are costly.

It is an object of this invention to provide a novel post cap that is especially useful for joining a horizontal beam to a vertical supporting post. It is still another object of this invention to provide such a post cap made from a flat blank that is punched, cut, and bent to form the final shape. Still other objects will become apparent from the more detailed description which follows.

BRIEF SUMMARY OF THE INVENTION

This invention relates to a post cap for use in joining two wooden beams in a common plane in which a first beam abuts the second beam at a right angle, the cap comprising two spaced parallel plates joined to each other by a pair of spaced strips perpendicular to both said plates, each said plate being punctured by a plurality of spaced nail holes adapted to guide nails into said beams, and also being punctured by a slotted passageway to guide a toenail piercing both said beams along said common plane.

In specific and preferred embodiments of the invention the post cap is made from a single flat sheet which is cut, punched, and folded to form the final post cap with no welding required.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 7:
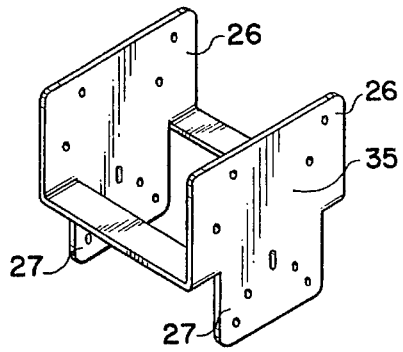
FIG. 7 is a perspective view of the post cap of FIGS. 1–3.
Figure 8:
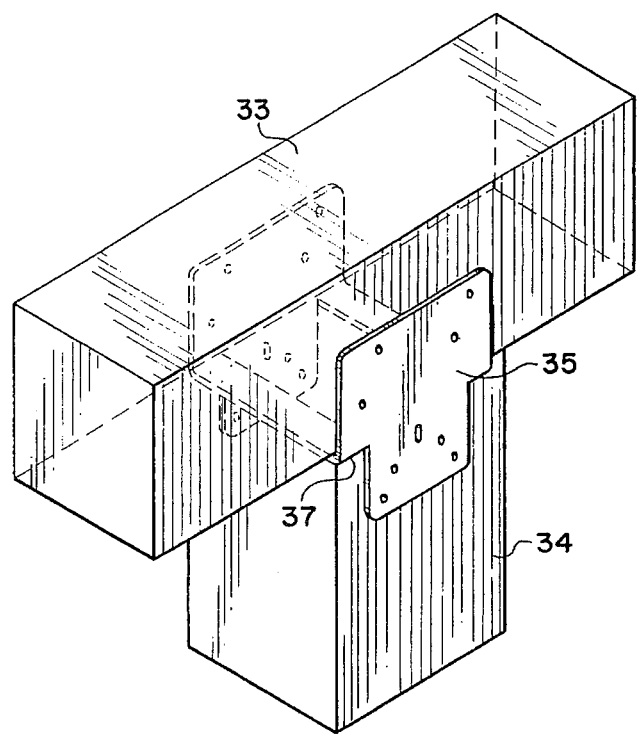
FIG. 8 is a perspective view of the post cap of FIGS. 1–3 as it is used to join two wooden beams.
Figure 10:
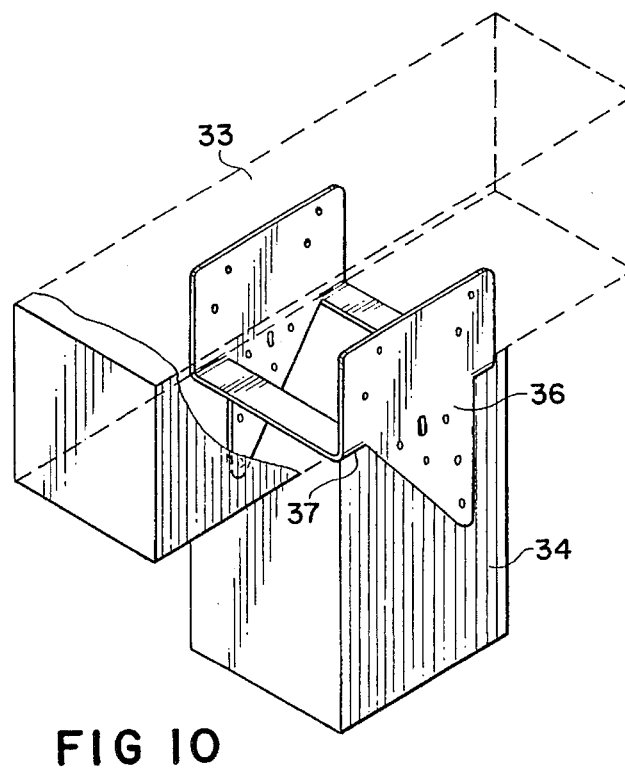
FIG. 10 is a perspective view of the post cap of FIG. 4 as it is used to join two wooden beams.
Figure 12:
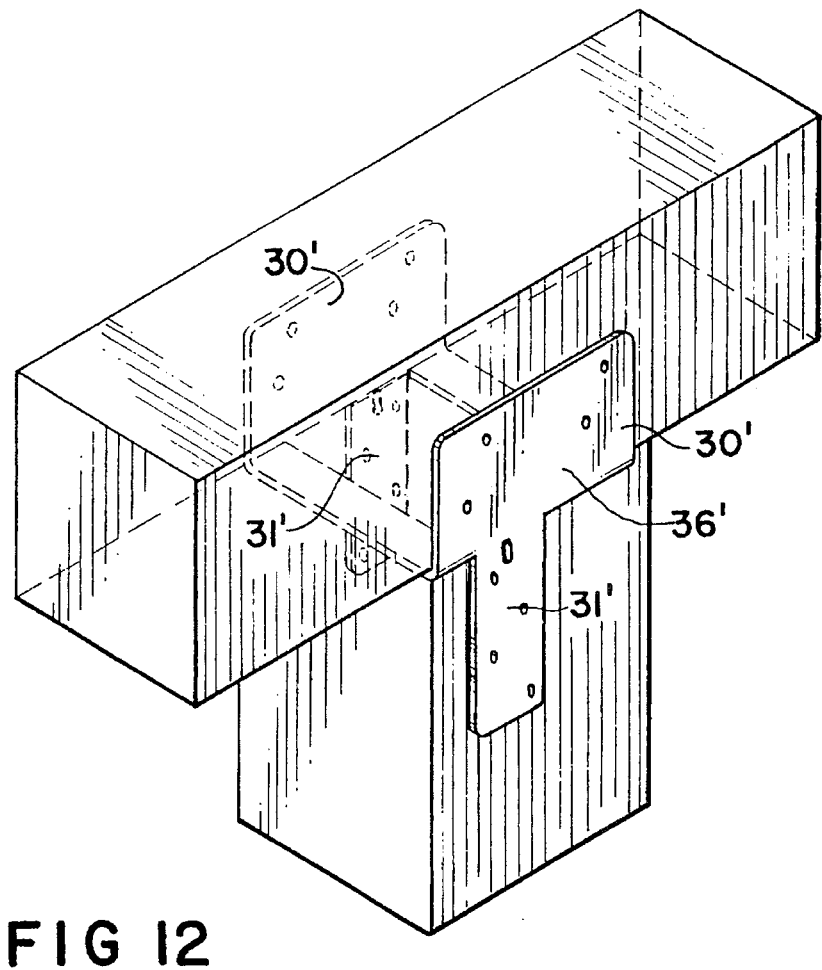
FIG. 12 is a perspective view of the post cap of FIG. 11 as it is used to join two wooden beams.

The post cap of this invention is best understood by reference to the accompanying drawings wherein FIGS. 8, 10, and 12 show the preferred use of the post cap 35 or 36 or 36' in joining two wooden beams or beam 33 and post 34. The most used combination of beams for this invention is where a horizontal beam 33 is supported by a square-end vertical post 34 upon which horizontal beam 33 rests. In such instances in the past, the two beams were most commonly joined by toe nailing at an angle from horizontal beam 33 into vertical post 34 around the plane 37 where the two met. The post cap of this invention fits over the top of vertical post 34 as an inverted saddle, and also provides a second saddle in which horizontal beam 33 rests. Three embodiments of the post cap are shown in FIGS. 1–3, 5, 7 and 8; 4, 6, 9 and 10; and 11 and 12.

Each post cap has two parallel spaced plates 20 joined to each other by two spaced parallel strips 21, the plates 20 and the strips 21 being joined through fold lines 24. The spaced plates 20 each have an upper portion 26, 30 or 30' and a lower portion 27, 31 or 31'. Upper portions 26, 30 and 31' form a saddle for horizontal beam 33 and have nail holes 22 to guide nails or screws to be used to fasten plate portions 26, 30 and 30' to beam 33. Lower portions 27, 31 and 31' form inverted saddles for vertical post 34 with nail holes 22 used to guide nails or screws to fasten portions 27, 31 or 31' to vertical' beam 34. In addition to nail holes 22 there is a single slotted vertically oriented hole 23 in each plate 20 at the center thereof to guide a toe nail to be driven at an angle of about 45° to pierce both post 34 and beam 33. Preferably, slotted hole 23 is in lower portion 27, 31 or 31' adjacently below the common plane (37 in FIGS. 8 and 10) that passes between beams 33 and post 34 where post 34 supports beam 33 via strips 21 which are disposed in the common plane 37 connecting at each end to the respective right and left plates 20. For example, toe nailing of the post 34 to the horizontal beam 33 with two 16 penny nails increases the load capacity of the post cap by about 250 pounds. Typical uplift load capacity of the post cap 35 made of 18-gauge steel and shown in FIGS. 1–3, 7 and 8 is about 1678 pounds for 4×4 post and 4×4 beam of #2 Southern Pine, in which eight 16-penny nails are driven in all eight openings 22 and two 16-penny nails are toe nailed in both slots 23 whereas normal design load for such caps are 1262 pounds.

Figure 5:
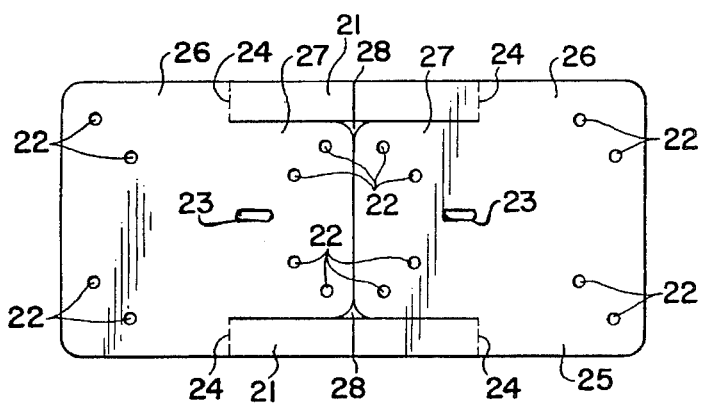
FIG. 5 is a blank which can be folded to make the post cap of FIGS. 1–3.

As seen in FIG. 5, the blank of the post cap includes a pair of portions 27 each with a height of approximately one-half of the length of strips 21. The blank of FIG. 6 includes a pair of portions 31 each with a height of approximately the length of strips 21. The blank of FIG. 11 includes a pair of portions 31' each with a height substantially equal to the length of strips 21'. The advantage of using the post cap formed from the blank of FIG. 5, i.e. post caps of FIGS. 7 and 8, is that the portions 27 are centered on the post 34 and the nail holes 22 are distributed more widely over the width of the post 34. The advantage of using the post cap formed from the blanks of FIGS. 6 and 11 is that the portions 31 and 31' are distributed more widely over the length of the post 34 tending to minimize splitting of the post 34 adjacent its upper end.

Figure 1:
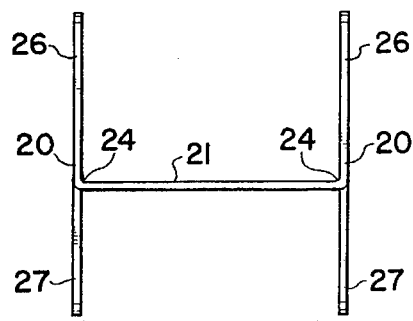
FIG. 1 is a front elevational view of the first embodiment of the post cap of this invention.
Figure 3:
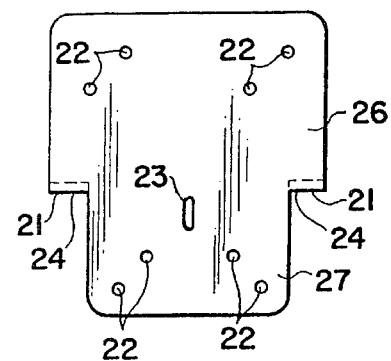
FIG. 3 is a side elevational view of the post cap of FIGS. 1–2.
Figure 2:
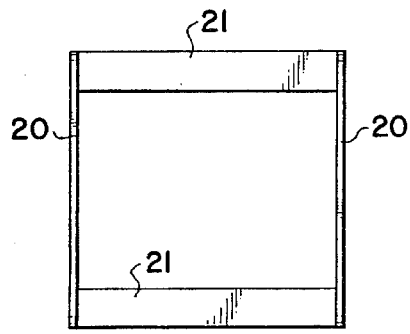
FIG. 2 is a top plan view of the post cap of FIG. 1.
Figure 4:
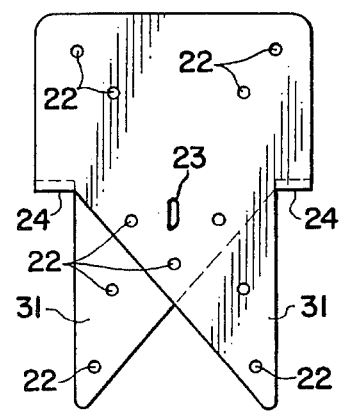
FIG. 4 is a side elevational view of the second embodiment of the post cap of this invention.
Figure 6:
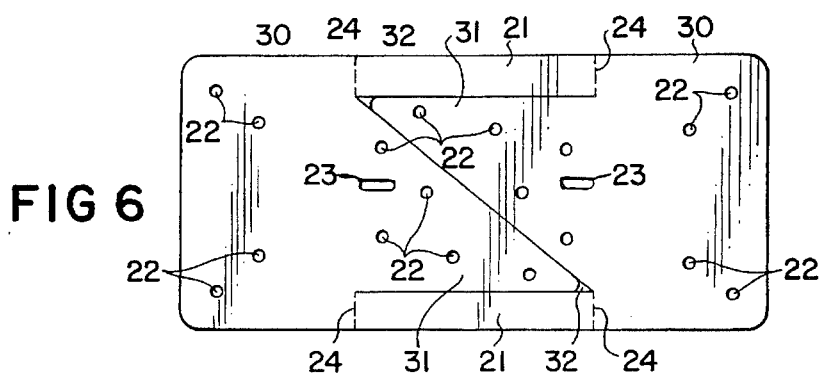
FIG. 6 is a blank which can be folded to make the post cap of FIG. 4.

FIGS. 3–6 illustrate how two types of post caps of this invention can be made. FIGS. 5 and 6 show how two flat sheets or blanks are prepared to make the two shapes of FIGS. 3 and 4, or of FIGS. 7 and 9. The two flat sheets are cut or blanked from a larger sheet along the solid lines. There are small waste areas 28 and 32 which are thrown away after the cutting or blanking operation so as to provide rounded corners which are safer to handle. Holes 22 and 23 are punched or drilled to produce passageways through the sheet. The final step is to fold the sheet along fold lines 24. For example, in FIG. 5, if the two outer portions 26 are each bent upward, the two portions 27 will be positioned downward along fold lines 24 resulting in the post cap of FIG. 7, which is also shown in FIGS. 1–3. Similarly, if in FIG. 6 the two outer portions 30 are bent upward about 90°, the two inner portions 31 remain co-planar with outer portions 30 and move downward around fold lines 24 resulting in the post cap of FIG. 9, which is also shown in FIG. 4.

Figure 9:
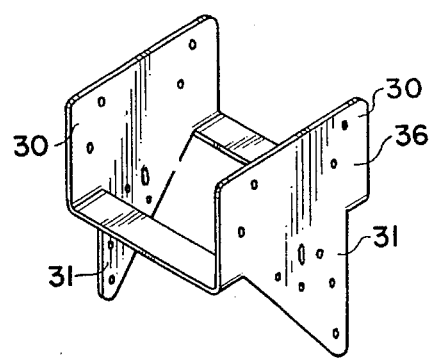
FIG. 9 is a perspective view of the post cap of FIG. 4.
Figure 11:
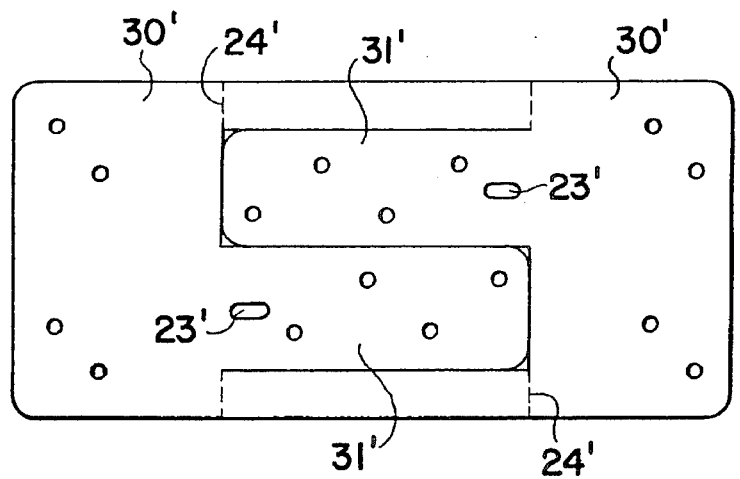
FIG. 11 is a blank which can be folded to make the third embodiment of post cap of this invention.

It is, of course, not critical that the shapes of FIGS. 7, 9 and 11 be employed, nor that the shapes of portions 26, 27; 30, 31; and 30', 31' be employed, although these are the simpler shapes to use. Other shapes might also be more costly, but might be equally useful. It is immaterial where nail holes 22 are located so long as they are spaced sufficiently to provide maximum stability, and to eliminate the possibility of splitting the beam or post along its grain.

The beams that are most suited for use with this post cap 35 are 4×4 or 6×6. Sometimes a 4×6 post is used with a 4×4 beam and the same post cap 35 fitting a 4×4 post is employed. Other sizes are operable but are not so commonly used. Preferably, the material of the post cap is galvanized steel, although other materials such as ordinary steel, stainless steel, copper, brass, aluminum, plastic and the like are suitable for many applications. The post cap may be made thin, while retaining the maximum strength. Thicknesses of 0.03–0.10 inch are typical. Gauge sizes of sheet metal may vary from about 11 to 22.

It is, of course, to be understood that the two beams to be joined need not be horizontal and vertical, but they should be substantially at a right angle to be used most effectively. One beam (the vertical in FIGS. 8 and 10) is the abutting beam having its end cut off squarely; and the other beam (the horizontal in FIGS. 8 and 10) is the abutted beam presenting a face of the beam to the cut off end. These two beams may be at an angle with other portions of a structure, but are at a right angle to each other. Either beam may be horizontal or vertical.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A post cap for use in joining two wooden beams in a common plane in which a first beam end abuts a second beam at a right angle, the cap comprising two spaced parallel plates joined to each other by a pair of substantially identical spaced parallel strips perpendicular to both said plates, each said plate being punctured by a plurality of spaced nail holes adapted to guide nails into two wooden beams, and also being punctured by an elongated slotted passageway having a longitudinal axis substantially perpendicular to said strips adapted to guide a toe nail to pierce along a common plane of two wooden beams.

2. The post cap of claim 1 which is a single integral sheet of metal, cut, punched, and folded into its final shape.

3. The post cap of claim 2 in which said strips are adapted to lie flat in said common plane between the abutting end of a vertical beam and a side of an abutted horizontal beam; said parallel plates being adapted to lie contiguous to a side of two wooden beams extending vertically above and below said plane, said strips being joined at each end thereof at a fold line to said respective plates.

4. The post cap of claim 3 wherein a portion of each said plate which is adapted to lie contiguous to a horizontal beam is rectangular.

5. The post cap of claim 4 wherein a portion of each said plate which is adapted to lie contiguous to a vertical beam is rectangular.

6. The post cap of claim 4 wherein a portion of each said plate which is adapted to lie contiguous to a vertical beam is triangular.

7. A post cap for joining two wooden beams at a right angle wherein the end of one beam abuts another beam; said cap comprising two parallel spaced plates, each said plate being adapted to lie contiguous to two wooden beams on opposite sides thereof, and two substantially identical spaced parallel strips attached to lie between said beams where they are joined together; said plates being punctured by a plurality of nail guide holes and by a single central elongated slotted hole extending substantially perpendicularly to said strips to guide a toe nail in piercing both wooden beams.

8. The post cap of claim 7 which is a single sheet of metal, cut, punched, and folded to a final double saddle shape.

9. An integral post cap for use in joining a post to a beam in a common plane in which a post and beam are at a right angle, the cap comprising a pair of spaced parallel upright plates having upright outer side edge portions, a pair of substantially identical spaced parallel strips connected directly to a medial portion of said plates and being substantially perpendicular to each of said plates, said strips having outer side edges respectively spanning between and substantially aligned with said outer side edge portions of respective said plates, each said plate containing a plurality of spaced nail holes adapted to guide nails into a post and a beam.

10. The post cap of claim 9 wherein each said plate having at least one slotted elongated passageway extending substantially perpendicularly to said strips and being spaced generally medially between said pair of strips and below a common plane of said strips.

11. The post cap of claim 10 wherein said common plane is generally medially of each of said plates.

12. The post cap of claim 9 in which said strips are adapted to be disposed in a common plane between an end of a vertical post and a side of a horizontal beam, said parallel plates being adapted to lie contiguous to a vertical post and a horizontal beam and extending vertically above and below said common plane, said strips being joined at each end thereof at a fold line to respective said plates.

13. The post cap of claim 12 wherein each of said plates which is adapted to lie contiguous to a horizontal beam is rectangular.

14. The post cap of claim 13 wherein each of said plates which is adapted to lie contiguous to a vertical post is rectangular.

15. The post cap of claim 13 wherein each of said plates which is adapted to lie contiguous to a vertical post is triangular.

16. The post cap of claim 9 which is a single sheet of metal, cut, punched, and folded to an H-shaped cross-section at each of said strips and said plates.

17. The post cap of claim 12 wherein each of said plates which is adapted to lie contiguous to a vertical post is rectangular.

18. The post cap of claim 17 wherein each of said plates is adapted to lie contiguous to a vertical post has a height equal to one-half length of each of said strips.

19. The post cap of claim 17 wherein each of said plates is adapted to lie contiguous to a vertical post has a height substantially equal to a length of each of said strips.

20. The post cap of claim 12 wherein each of said plates which is adapted to lie contiguous to a vertical post is substantially triangular.

21. The post cap of claim 20 wherein each of said plates is adapted to lie contiguous to a vertical post has a height generally equal to a length of each of said strips.

22. The post cap of claim 12 which is a single sheet of metal, cut, punched, and folded to an H-shaped cross-section at each of said strips and said plates.

23. A post cap blank comprising a rectangular planar member having spaced parallel outer end edges and spaced parallel outer side edges, a pair of elongated horizontal cuts extending respectively parallel to said side edges and terminating remotely from said end edges, an elongated vertical cut extending between said pair of cuts, said member having spaced holes to receive nails therethrough, said member having a vertical fold line at each end of said pair of cuts whereby said member may be bent substantially 90 degrees along vertically aligned said vertical folds, said member being adapted to form a pair of spaced parallel plates connected to each other by a pair of substantially identical spaced parallel strips with the outer side edges of said blank forming the outer side edges of the strips and outer side edge portions of the plates.

24. The post cap blank of claim 23 wherein said strips are in a common plane.

25. The post cap blank of claim 24 wherein each said plate includes at least one slotted elongated passageway extending substantially parallel and spaced generally medially between said strips and located between said cuts and adjacent said vertically aligned said vertical folds.

26. A post cap blank comprising a rectangular planar member having spaced parallel end edges and spaced parallel side edges, a pair of elongated cuts extending respectively parallel to said side edges and terminating remotely from said end edges, an elongated diagonal cut extending between oppositely disposed ends of said pair of cuts, said member having spaced holes to receive nails therethrough, said member having a fold line at each end of said pair of cuts whereby said member may be bent substantially 90° along aligned said fold lines, said member being adapted to form a pair of spaced parallel plates connected to each other by a pair of spaced parallel strips, said plates above said strips being substantially rectangular, and said plates below said strips being substantially triangular and having a length generally equal to a length of each of said strips.

27. A post cap blank comprising a rectangular planar member having spaced parallel end edges and spaced parallel side edges, a pair of elongated cuts extending respectively parallel to said side edges and terminating remotely from said end edges, an elongated medial cut extending parallel to and spaced equidistant from said pair of cuts, said member having spaced holes to receive nails therethrough, said member having a fold line at each end of said pair of cuts whereby said member may be bent substantially 90° along aligned said vertical fold lines, a pair of spaced cuts respectively along respective said fold lines and each intersecting said medial cut and respective said pair of cuts, said member being adapted to form a pair of spaced parallel plates connected to each other by a pair of spaced parallel strips, said plates above said strips being substantially rectangular, and said plates below said strips being substantially rectangular and having a length substantially equal to a length of each of said strips.

\* \* \* \* \*